US006571201B1

(12) United States Patent
Royal, Jr. et al.

(10) Patent No.: US 6,571,201 B1
(45) Date of Patent: May 27, 2003

(54) REMOTE-ACCESS FUEL DISPENSER USING A DATA TYPE AWARE MARK-UP LANGUAGE

(75) Inventors: William C. Royal, Jr., Oak Ridge, NC (US); Kenneth L. Ringeman, Kernersville, NC (US)

(73) Assignee: Gilbarco Inc., Greensboro, NC (US)

( * ) Notice: Subject to any disclaimer, the term of this patent is extended or adjusted under 35 U.S.C. 154(b) by 273 days.

(21) Appl. No.: 09/641,366

(22) Filed: Aug. 18, 2000

(51) Int. Cl.[7] ........................ G06F 11/00; G06F 15/00; G06F 17/00

(52) U.S. Cl. ........................................ 702/188; 700/231

(58) Field of Search ........................ 702/127, 182–185, 702/188; 709/100, 102, 103, 200–203, 217–226; 455/91, 92; 707/513; 700/231

(56) References Cited

U.S. PATENT DOCUMENTS

| | | | | |
|---|---|---|---|---|
| 5,155,847 A | | 10/1992 | Kirouac et al. | 395/600 |
| 5,530,852 A | * | 6/1996 | Meske et al. | 709/206 |
| 5,732,219 A | | 3/1998 | Blumer et al. | 395/200.57 |
| 5,761,673 A | | 6/1998 | Bookman et al. | 707/104 |
| 5,781,909 A | | 7/1998 | Logan et al. | 707/200 |
| 5,790,977 A | | 8/1998 | Ezekiel | 702/122 |
| 5,831,861 A | * | 11/1998 | Warn et al. | 700/231 |
| 5,835,712 A | | 11/1998 | DuFresne | 395/200.33 |
| 5,845,075 A | | 12/1998 | Uhler et al. | 395/200.3 |
| 5,859,972 A | | 1/1999 | Subramaniam et al. | 395/200.33 |
| 5,892,905 A | | 4/1999 | Brandt et al. | 395/187.01 |
| 5,898,835 A | | 4/1999 | Truong | 395/200.47 |
| 5,899,975 A | | 5/1999 | Nielsen | 704/260 |
| 5,905,248 A | | 5/1999 | Russell et al. | 235/462 |
| 5,905,908 A | | 5/1999 | Wagner | 395/831 |
| 5,926,116 A | | 7/1999 | Kitano et al. | 340/988 |
| 5,928,323 A | | 7/1999 | Gosling et al. | 709/203 |
| 5,937,163 A | | 8/1999 | Lee et al. | 395/200.48 |
| 5,944,782 A | | 8/1999 | Noble et al. | 709/202 |
| 5,974,441 A | * | 10/1999 | Rogers et al. | 709/200 |
| 5,980,090 A | * | 11/1999 | Royal et al. | 700/241 |
| 6,026,866 A | | 2/2000 | Nanaji | 141/59 |
| 6,052,629 A | | 4/2000 | Leatherman et al. | 700/241 |

(List continued on next page.)

OTHER PUBLICATIONS

Projectcool developerzone, XSL, (c) 1998–1999, DevX.com Inc., http://www.devx.com/projectcool/developer/xmiref/abc/xsl.htm.*

ISE Ltd., "ISE Solutions Shell SmartPump", Oct. 22, 1997, http://web.archive.org/web/19971022154548/http://www.ise.bc.ca/smart.html.*

Bosak, Joe, "XML, Java and the future of the Web", Jul. 10, 1997, http://www.ibiblio.org/pub/sun–info/standards/sml/why/xmlapps.htm.*

"XML Arriver", Reid, Keith, National Petroleum News, Apr. 2002, pp. 60–61.

"Extensible Markup Language (XML) 1.0", www.w3.org, Oct. 23, 2002, pp. 1–56.

*Primary Examiner*—Marc S. Hoff
*Assistant Examiner*—Mary Catherine Baran
(74) *Attorney, Agent, or Firm*—Withrow & Terranova PLLC

(57) ABSTRACT

A fuel dispenser includes data type aware SGML processing capabilities allowing it to efficiently process received data having a variety of data types. Such received data typically includes fuel dispenser configuration information. Further benefits related to data type aware SGML processing within the fuel dispenser include the ability to transfer information in a data type aware SGML format from the fuel dispenser, such as diagnostics data, to a remote system. Data type aware SGML data definitions facilitate conversion of the data type aware SGML-formatted diagnostics data into a machine format usable by the remote system. Preferably, the fuel dispenser includes an HTTP server for communicating with remote client's systems that employ data type aware SGML-capable, web browsers.

21 Claims, 5 Drawing Sheets

U.S. PATENT DOCUMENTS

| | | | | | |
|---|---|---|---|---|---|
| 6,176,421 | B1 | * | 1/2001 | Royal et al. | 235/381 |
| 6,182,092 | B1 | * | 1/2001 | Francis et al. | 707/513 |
| 6,275,746 | B1 | | 8/2001 | Leatherman et al. | 700/234 |
| 6,311,223 | B1 | * | 10/2001 | Bodin et al. | 709/247 |
| 6,360,137 | B1 | * | 3/2002 | Royal et al. | 700/231 |
| 6,401,132 | B1 | * | 6/2002 | Bellwood et al. | 709/246 |
| 6,425,525 | B1 | * | 7/2002 | Swaninathan et al. | 235/385 |
| 6,430,541 | B1 | * | 8/2002 | Brown et al. | 705/28 |
| 6,442,448 | B1 | * | 8/2002 | Finley et al. | 700/231 |

* cited by examiner

REMOTE-ACCESS FUEL DISPENSER USING A DATA TYPE AWARE MARK-UP LANGUAGE

FIELD OF THE INVENTION

The present invention relates to providing remote monitoring and configuration capabilities in an electronics system and, in particular, relates to providing enhanced remote configuration and diagnostics in a fuel dispenser.

BACKGROUND OF THE INVENTION

Electronic or computer-based systems commonly include remote monitoring and configuration capabilities, thereby allowing personnel, especially off-site personnel, to interact with the local system. Such interaction may relate to obtaining current operating conditions for the local system, or to obtaining stored data associated with local system operation, or may relate to providing one or more sets of operating parameters for the local system. Regardless of the specific use or requirement for remote interaction, remote access features and techniques available in various electronic systems evolve as the supporting communication technologies themselves evolve.

Today, there are many classes of electronic devices, ranging from standard desktop computing devices to those categorized as having "embedded" computers for automated control, that leverage standard, ubiquitous Internet technology to allow remote access. It is a straightforward and increasingly common practice to embed Transmission Control Protocol/Internet Protocol (TCP/IP) networking and a service, such as a Hyper-Text Transfer Protocol (HTTP), in a device to allow it to be managed via any Hyper-Text Mark-Up Language (HTML) compliant Web browser. This is advantageous for several reasons. First, such devices can be managed locally and directly by many Web browser applications using direct connection interfaces, including but not limited to the Point-to-Point Protocol (PPP), which allows TCP/IP communication over standard RS-232-compliant serial interfaces commonly found on portable computing devices. Second, remote management of such devices is achievable over any network—including the Internet—as long as it provides the TCP/IP interface.

For example, pending application Ser. No. 08/896,988, commonly assigned with the present invention, relates, in part, to an interactive file dispensing system in which one or more fuel dispensers interact with a server. Each fuel dispenser provides customers with a browser-based interface for conducting fueling transactions and, potentially, accessing information from outside networks, such as the World Wide Web. Fuel dispensers support such interaction through implementing standard HTTP/HTML data transfers.

However, remote access capabilities based on the use of HTML-formatted data transmitted over an HTTP protocol interface have increasingly significant drawbacks. First, HTML is designed primarily for visual representation of data. HTML formatting combines information, possibly comprised of disparate data items, into one or more strings of text having associated formatting "tags." These tags define how the corresponding data should be formatted for visual display but provide no meaning regarding the underlying data types represented by the strings of text. Remedying this first limitation of HTML is complicated by its second limitation. HTML is, to some considerable advantage, a "standards-based" Standardized General Markup Language (SGML) maintained by the World-Wide Web Consortium (W3C). Because of HTML standards, HTML-compliant Web browsers may reliably implement common features and services. However, this standardization discourages any one group or industry from adapting HTML to its particular needs by including custom-defined tags that, for example, impart specialized data type meaning to HTML text strings.

U.S. Pat. No. 5,980,090 issued to Royal, Jr., et al., and commonly assigned with the present invention, relates to providing communication servers associated with the fuel dispensers in a fueling environment, and connecting the communication servers to a common network. This network may be a remote network, such as the Internet. The '090 patent, and its associated pending divisional application Ser. No. 09/334,550, overcome limitations associated with HTML-based remote access and data transfer by including an embedded function in the servers associated with the fuel dispensers. This embedded function executes in response to a remote system accessing one or more specific HTML pages stored on the servers(s). Through its execution, the embedded function can provide, among other things, continuously updated parameter transfers, or remote configuration access.

Newer generation SGMLs are designed with data-type aware information transfer in mind. Data-type aware SGML tags define associated data and may be extended to define complex data structures. Thus, a device receiving data type aware SGML formatted data can easily delineate one data item from the next, and easily determine data types, based on processing the associated data type aware SGML tags. Moreover, data type aware SGML-formatted data may be conveniently formatted for visual display using a data type aware style-sheet language (hereinafter referred to as "SSL"). Due to the number of existing browsers using non-data type SGMLs, it may be necessary to convert a data type aware SGML to a non-data type aware SGML using a SSL. With a data type aware SSL, data type aware SGML-based data may be translated into non-data type aware SGMLs such as HTML-based information for formatted visual display.

Thus, data type aware SGML-data transfer between a device and a remote system simplifies the processing associated with converting received data into a format usable by either the local device or the remote system. In combination with a data type aware SSL sheet, data received from the device may still be conveniently converted into non-data type aware SGMLs for visual display. These capabilities impart advantages to devices that include both non-interactive (system-to-system) remote interfacing as well as interactive (operator-based) remote interfacing.

Accordingly, the present invention includes a fuel dispenser with enhanced remote access and data transfer capabilities. The ability of the fuel dispenser to send and receive data type aware SGML-formatted data permits a remote system to efficiently transfer configuration or operating data to the device on a non-interactive basis, as well as to receive diagnostic or monitoring information. When interactive interfacing is desired, the data type aware SGML-formatted data received at the remote system may be formatted for display to an operator using data type aware SSL information received from the fuel dispenser.

SUMMARY OF THE INVENTION

The present invention provides methods and apparatus allowing a fuel dispenser to send and receive data formatted using a data type aware SGML. In an exemplary embodiment, the fuel dispenser includes a communications interface implementing an HTTP service for file transfer operations, including the transfer of data type aware SGML-based data between the fuel dispenser and a remote system. In other exemplary embodiments, the fuel dispenser may support other protocols that supplement or replace the HTTP service, including File Transfer Protocol or proprietary protocols. Data type aware SGMLs may include document definition types that permit data items to be validated against predefined definitions. Thus, data type aware SGML-based data transfers between the fuel dispenser and the remote system include the data types and relationships associated with the underlying data. In this manner, the fuel dispenser and remote system may efficiently process received information based on parsing and interpreting the data type aware SGML-based data definition tags.

Data type aware SGML-based data transfers to and from the fuel dispenser particularly benefit automated remote interaction. The fuel dispenser may implement one or more data type aware SGML-based grammars that define sets of data definitions. This allows a remote system to conveniently retrieve, monitor, or update fuel dispenser parameters using data items tagged in accordance with the defined grammar. This capability facilitates non-human data transfer and diagnostic operations conducted between the fuel dispenser and the remote system, as well as providing a convenient data format for translation into viewable information when human operator interaction is required.

A remote operator may monitor and configure the fuel dispenser using an HTML-compliant Web browser executing on the remote system. Preferably, the data type aware SGML is XML and this remote system Web browser is XML-compliant such that it formats the XML data received from the fuel dispenser for display in HTML format. Preferably, the data type aware SSL is the extensible style sheet language, and an XSL style sheet is transferred from the fuel dispenser to the XML/XSL-compliant Web browser to correctly format XML data in an HTML page. Alternatively, if the remote system does not have an XML-compliant Web browser, the fuel dispenser may include a Java applet providing XML processing capability for transfer to the remote system. In still other variations, the fuel dispenser may provide HTML-based information to the remote system, based on pre-processing its stored XML-formatted data.

DETAILED DESCRIPTION OF THE INVENTION

Figure 1:
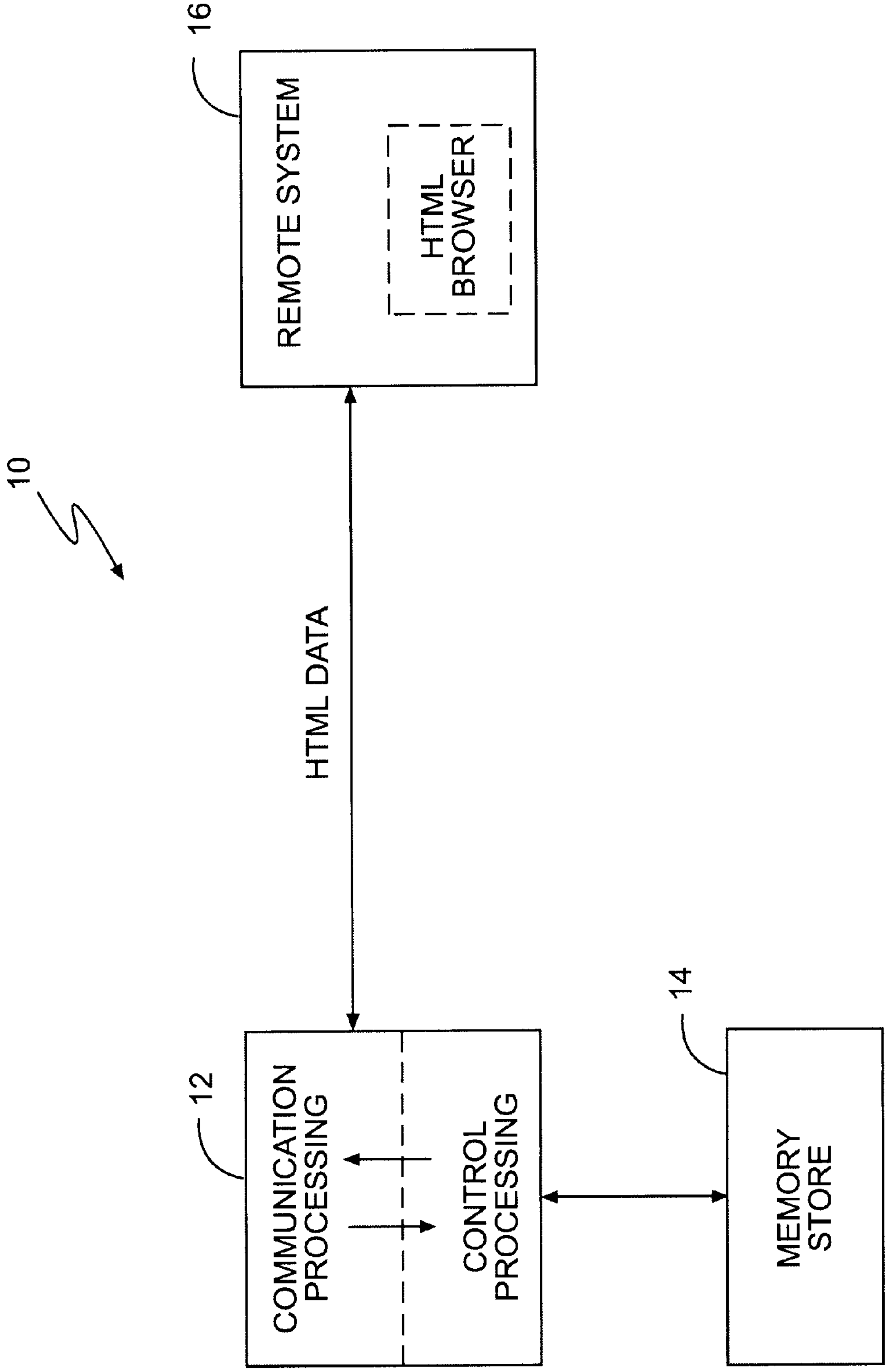
FIG. 1 PRIOR ART
FIG. 1 is a simplified block diagram of a prior-art system illustrating HTML-based data transfer between a local device and a remote system.

FIG. 1 illustrates a prior art Internet-based remote access and monitoring system, generally indicated by the numeral 10. A local electronics device 12 includes communication and control processing capabilities for carrying out its intended functions and for communicating with other systems, including a remote system 16. Data associated with the operation and configuration of the device 12 is held in an associated memory 14. The device 12 communicates with the remote system 16 using TCP/IP-based transfers managed by an included HTTP server. Thus, the remote system 16 receives information from the device 12 based on submitting HTML page requests to the local device 12. The requested data items are recovered from internal memory (not shown) associated with the control processing portion of device 12, or are retrieved from its associated memory 14. Device 12 then converts this information into HTML format for transfer to the remote system 16. As earlier noted, HTML formatting of the requested data requires reformatting the data into text strings and associated HTML markup (formatting) "tags".

Although suitable for their task, the markup tags in HTML—labels that provide cues to web browsing applications—do not define what the data means, but rather only how it should be visually represented. Automated, non-human interaction with the local device 12, as by an automated control or data acquisition system, is complicated by having only HTML-formatted data transferred from the local device 12. HTML data transfers do not include data markers or data definition tags; rather they contain textual data interspersed with visual formatting tags. As such, data parsing is generally based on predefined rules regarding the transferred data that rely on a prior knowledge regarding the structure, length, and order of the information requested. As such, HTML-based data transfers can be relatively unaccommodating with regard to updating or changing the type and order of data transferred. Further, complications arise from the overhead associated with parsing the HTML strings to identify the individual data items and convert them to a machine-usable format.

Simply, HTML-based data transfers are not well suited to systems that must process or otherwise act upon all or part of the transferred information. Thus, in this scenario, the information received by the remote system 16 is convenient with regard to displaying it in a Web browser window, but is relatively inconvenient with regard to processing or using the received data in any matter dependent upon the actual data types represented by the HTML-formatted information.

In contrast to the visual-formatting focus of HTML, XML, a preferred type of data type aware SGML, is a meta-markup language providing a set of rules for describing data. For example, XML-formatted data comprises one or more "elements" delimited by a start tag, an end tag, and intervening data. Start and end tags describe the data between them, while the data itself defines the value of the element. Thus, an XML element relating to a city within an address database might appear as "<city>Raleigh</city>." Here, the "<city>" represents the start tag, "</city>" represents the end tag, and the element "city" has the value "Raleigh." Further, elements can contain one or more attributes. Thus, <city ZIP="27606">Raleigh</city> defines a zip code attribute for the element value Raleigh. Elements may be nested to form more complex data structures.

As an example,

```
<addresses>
  <address>
    <name>John Smith</person>
    <street>Main</street>
    <city>Raleigh</city>
    <state>NC</state>
    <zip>27606</zip>
  </address>
</addresses>
```

illustrates one "address" element in a larger "addresses" element. The element "addresses" may include any number of individual address entries. Parsing the "addresses" structure to extract individual "address" entries simply entails parsing the overall data set based on the start and end tags. From this simplistic example, one skilled in the art will readily appreciate the utility of XML as applied to data transfers between computer systems when that data must be translated into machine or binary format for subsequent processing by one or both such computer systems. It is also noted that while an exemplary embodiment of the present invention uses XML as its data type aware SGML and XSL as its data type aware SSL, the present invention may be accomplished using data type aware SGMLs and SSL's other than XML and XSL, respectively. Therefore, the present invention is not limited to XML or XSL hereto.

Figure 2A:
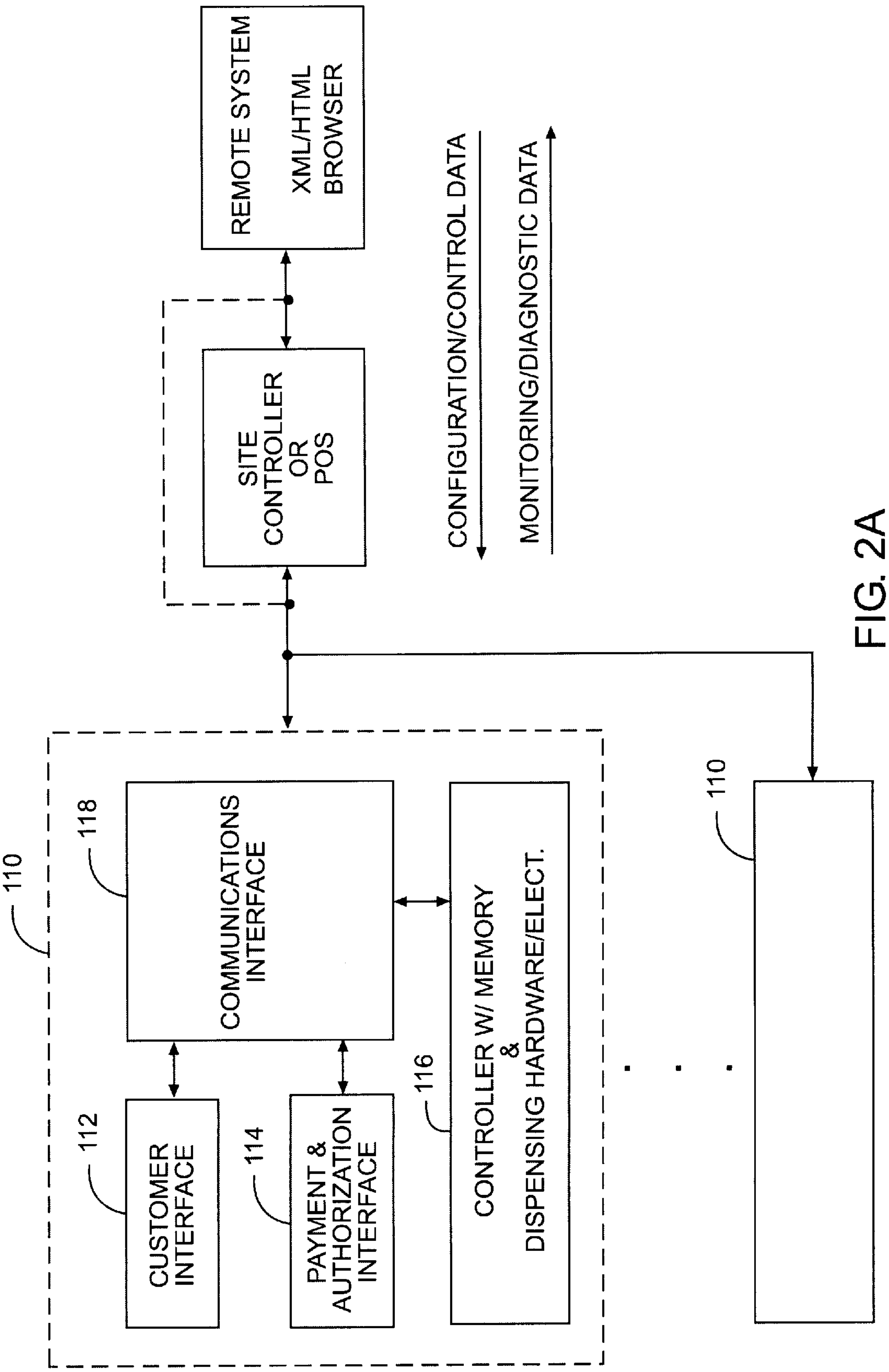
FIG. 2A is a simplified block diagram of a fuel dispensing system incorporating a fuel dispenser in accordance with an exemplary embodiment of the present invention.

FIG. 2A illustrates a fuel dispensing system 100 in accordance with an exemplary embodiment of the present invention. A site controller (or point-of-sale terminal) 120 provides control signals to one or more fuel dispensers 110. In operation, customers interact with the fuel dispensers 110 using a customer interface 112 that normally includes status and information displays, and fuel grade selection inputs. A payment and authorization interface 114 permits customers to effect payment for individual fueling transactions using a number of payment methods, including but not limited to credit/debit cards and wireless payment transponders. A communications interface 118 provides an interface between the site controller 120 and the fuel dispenser 110 for the transfer of payment and authorization information and dispenser control signals. A fuel dispenser controller 116 (including associated dispensing hardware and electronics) is responsible for actually dispensing fuel to a customer based on these dispenser control signals.

In this exemplary embodiment for the fuel dispenser 110 of the present invention, the communications interface implements an HTTP server and XML processor to support XML-based data exchanges with the remote system 130 and site controller 120. Such data transfers may be involved in a variety of fuel dispenser remote access activities. Such access includes, but is not limited to the following activities: a) normal setup and programming; b) calibration; c) specific device setup or site configuration; and d) remote viewing of fuel dispenser operating or configuration parameters.

While the particular implementation of communications interface 118 varies based on the design needs of specific fuel dispensing systems, the communications interface 118 should support the software functionality necessary to implement the required HTTP (or other protocol) and XML services. Further, communications interface 118 should have the supporting hardware necessary to support a communications connection with site controller 120 and/or remote system 130. Preferably, the communications interface 118 will support multiple communications interfaces to enhance flexibility regarding its interconnection. Such interfaces are well understood in the art with regard to design and implementation and include Ethernet or other LAN-type interfaces, EIA-232, Universal Serial Bus (USB), RS-485, and others.

When referring to "remote access" operations herein, the term should be understood as including access by both physically remote, as well as local systems. Indeed, remote system 130 may be far removed from fuel dispenser 110 and communications between the two systems may be based on direct or indirect network connection—such as LAN/WAN interconnection. Conversely, remote system 130 may be physically proximate to fuel dispenser 110, such a laptop computer in direct cable connection to fuel dispenser 110. Further, discussion herein regarding remote access should be understood to possibly include operations between the fuel dispenser 110 and site controller 120. Indeed, site controller 120 may advantageously use capabilities in the fuel dispenser 110 of the present invention for monitoring and control.

Figure 2B:
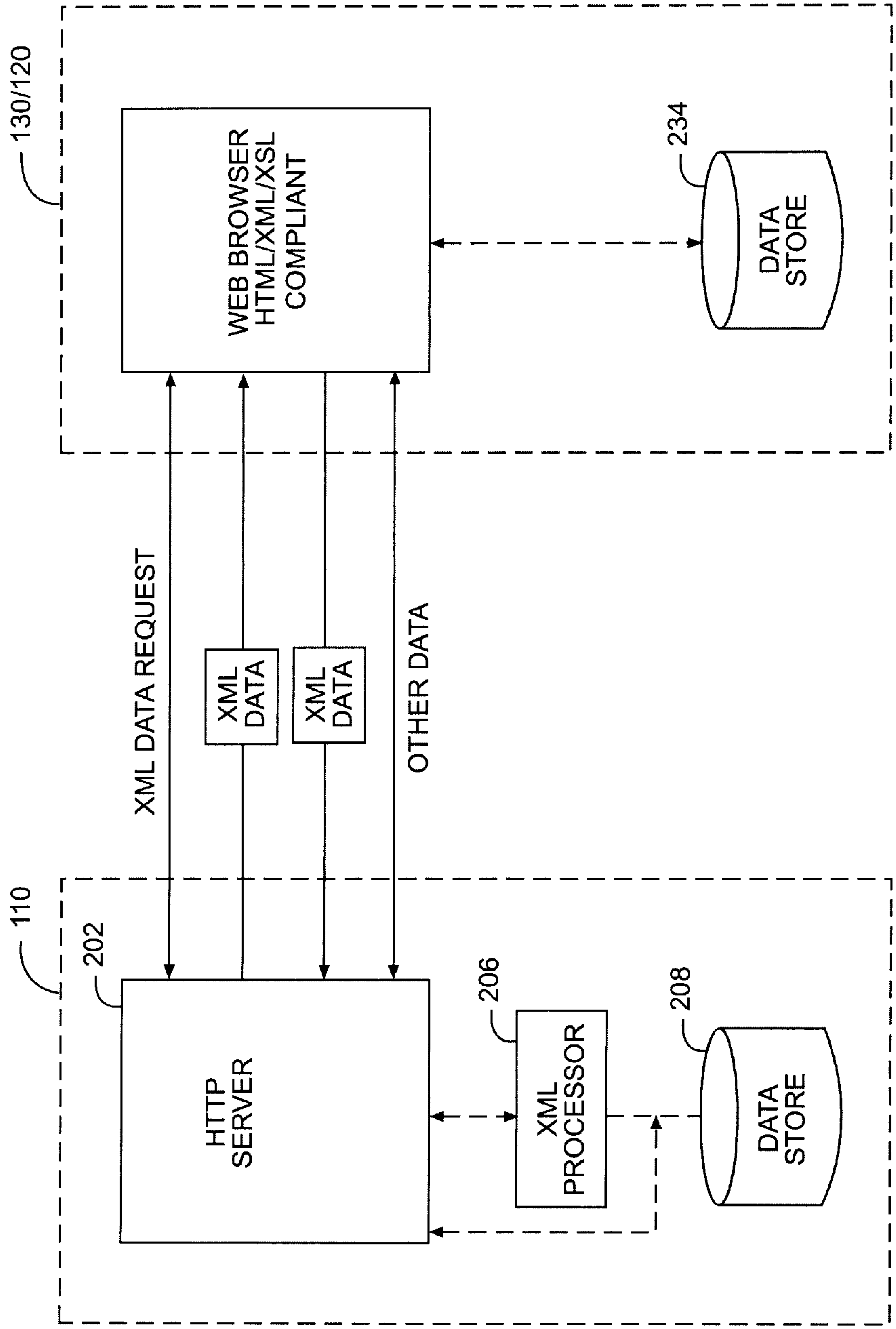
FIG. 2B is a functional diagram illustrating data-aware SGML data transfer between a fuel dispenser and a remote system in accordance with an exemplary embodiment of the present invention.

FIG. 2B provides more detail for the fuel dispenser 110 illustrated in FIG. 2A. An HTTP server 202 transfers information to the remote system 130 in XML format, based on the remote system 130 making an XML data request. An XML processor 206 functionally included within the fuel dispenser 110 processes fuel dispenser operating or historical data for conversion to XML format. Note this data may be retrieved from a data store 208 or from fuel dispenser operating memory (not shown). In an exemplary embodiment, the data store 208 includes non-volatile memory for persistent storage of critical operating parameters used to tailor operation of the fuel dispenser 110 to the operating requirements of a particular installation.

If the remote system requires the data for subsequent processing, the XML data definition tags included in the transferred data allow the remote system 130 to easily parse the received data using an HTML/XML-compliant web browser and convert the included individual data items into corresponding binary (machine-format) values. Such data may be used directly by the remote system 130 or held in a data store 208 for later use or review.

If, however, the transferred data must be displayed to an operator using the remote system 130 to interactively access/view data contained in the fuel dispenser 110, the remote system 130 may additionally receive XSL-based style sheet information from the fuel dispenser 110. XSL files associated with the XML data transferred from the fuel dispenser 110 to the remote system 130 are stored within the fuel dispenser. These XSL files contain sets of rules designed for the particular XML grammar (data definitions) implemented by the fuel dispenser 110 that describe how the XML data should be converted for display in a visual format. HTML represents an exemplary visual format to which the XML data may be converted using the XSL rules. Thus, in an exemplary embodiment, the remote system 130 receives XML-formatted data and, if visual formatting of the data is required for display to the operator, the remote system 130 receives XSL-based style sheet information from the fuel dispenser 110 that contains rules for how the XML data should be translated into HTML data. After translation to HTML, the data may be displayed to the operator using the remote system's 130 web browsing application.

Thus, an exemplary embodiment of the present invention envisions standards-based XML/HTML compliant software executing on the remote system 130. Data transferred between the fuel dispenser 110 and the remote system 130 includes XML-formatted data related to the operation or control of the fuel dispenser 110. XML tags included within the transferred data allow either the fuel dispenser 110 or the remote system 130 to easily parse the received data for conversion into binary (machine-format) for subsequent processing or use. In non-interactive data transfers between the fuel dispenser 10 and the remote system 130—again, this applies equally to site controller 120—the use of XML supplants the need for defining message-level protocols for transferring data between a service tool (remote device 130) and the fuel dispenser 110. For example, an XML grammar may be defined that allows general-purpose data to be defined by ID and type (e.g., fuel prices are fixed-point values—type—defined by fuel grade name and fueling position—ID).

XML files may be transferred between the fuel dispenser 110 and remote system 130 using several known techniques. If the remote system 130 is HTTP-compatible, then it may use HTTP for Universal Resource Locator (URL) named request response file transfers. (URLs uniquely specify named resources on the Internet.) If the remote system 130 supports other traditional standards, such as File Transfer Protocol (FTP), then these standards may be used for exchanging information with the fuel dispenser 110. Of course, proprietary transfer protocols unique to certain types of remote systems 130 may be utilized by providing the necessary software in the fuel dispenser 110. Of these choices, HTTP-based file transfer represents a preferred method because it easily handles text file transfers in the upload (to the fuel dispenser 110) and download (from the fuel dispenser 110) directions. Further, an HTTP request from the remote system 130 may be used to trigger an internal action within the fuel dispenser 110, as is well known in regard to Common Gateway Interface (CGI) scripting, and server-side applet execution.

For supporting interactive, operator-based connections between the fuel dispenser 110 and the remote system 130, the fuel dispenser 110 transfers XSL-based style sheet information that provides the remote system 130 with a set of rules for converting received XML data into operator-viewable HTML data.

Figure 3:
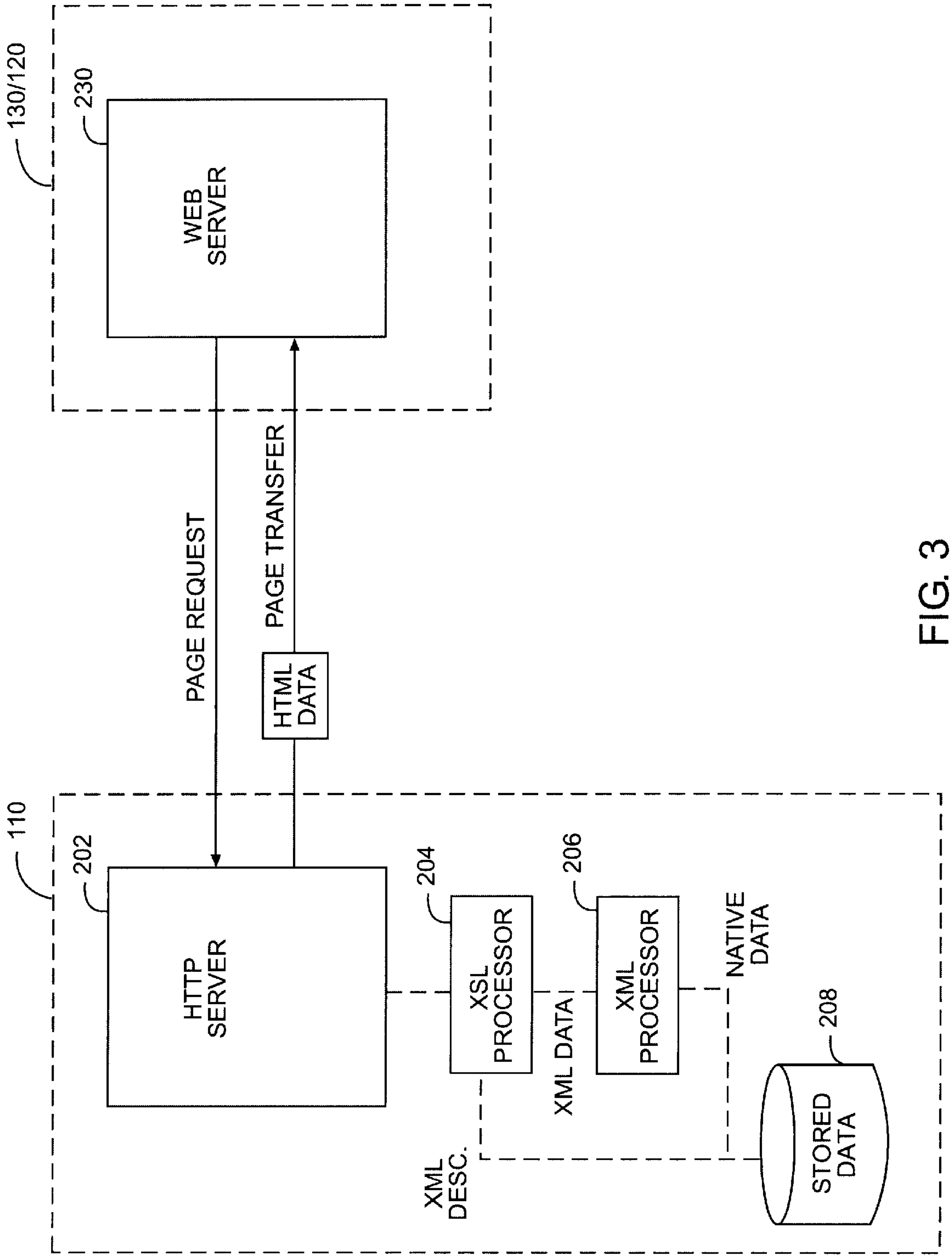
FIG. 3 is functional diagram illustrating HTML data transfer between a fuel dispenser and a remote system in accordance with an exemplary embodiment of the present invention.

Of course, not every remote system 130 may be expected to have the full set of capabilities necessary for supporting operations as identified for this exemplary embodiment. Thus, the fuel dispenser 110 of the present invention includes numerous exemplary embodiments providing modified operation suitable for interacting with less-capable remote systems. FIG. 3 illustrates one such exemplary embodiment for the fuel dispenser 110 of the present invention.

In FIG. 3, the fuel dispenser 110 interfaces with a remote system 130 that lacks native XML processing support. Further, due to platform limitations, the remote system 130 lacks the capability for local execution of an applet—a small, downloadable executable program—capable of providing XML support. Thus, data transfer between the fuel dispenser 110 and this more limited-functionality remote system 130 is based on HTML-formatted data. Of course, the fuel dispenser 110 in this alternate exemplary embodiment retains its ability for interfacing with more capable remote systems 130, as described in the discussion accompanying FIGS. 2A and 2B.

In the embodiment illustrated in FIG. 3, the fuel dispenser 110 includes supporting features allowing it to interact with a remote system 130 that lacks the ability to process XML data. As such, the fuel dispenser 110 applies internally stored XSL-based style sheet information to XML formatted data to produce an HTML page. This may be accomplished using conventional web application techniques such as those based on the CGI, with such techniques being well known in the art. The XSL-based style sheet preferably defines an HTML forms-based interface for transfer to the remote system 130 that allows an operator at the remote system 130 to edit current fuel dispenser parameter values. Once the operator completes the desired edits, changes to the form data are transferred back to fuel dispenser 110 using, for example, the HTTP "POST" operation. When the edited form data is received, the fuel dispenser 110 parses the HTML data to extract the updated parameters. While internal fuel dispenser data could be converted directly from binary to HTML formatting, basing processing/parsing operations on XML-formatted data permits this exemplary embodiment to maintain a data handling approach that is consistent with the embodiment discussed in the context of FIGS. 2A and 2B.

In operation, the fuel dispenser 110 receives an HTML page request from a web browser 230 executing on the remote system 130. An HTTP server 202 functionally included within the fuel dispenser 110 manages this page request and subsequent data transfer. Stored data retrieved from the data store 208 is converted into XML-formatted data using an XML processor 206—data may also be retrieved from working memory (not shown) included within the fuel dispenser 110. An XSL processor 204 retrieves XSL-based style sheet information from the data store 208 for processing the XML data produced by the XML processor 206. The XSL processor 204 produces HTML-formatted data for transfer to the web browser 230 of the remote system 130 via the HTTP server 202.

Figure 4:
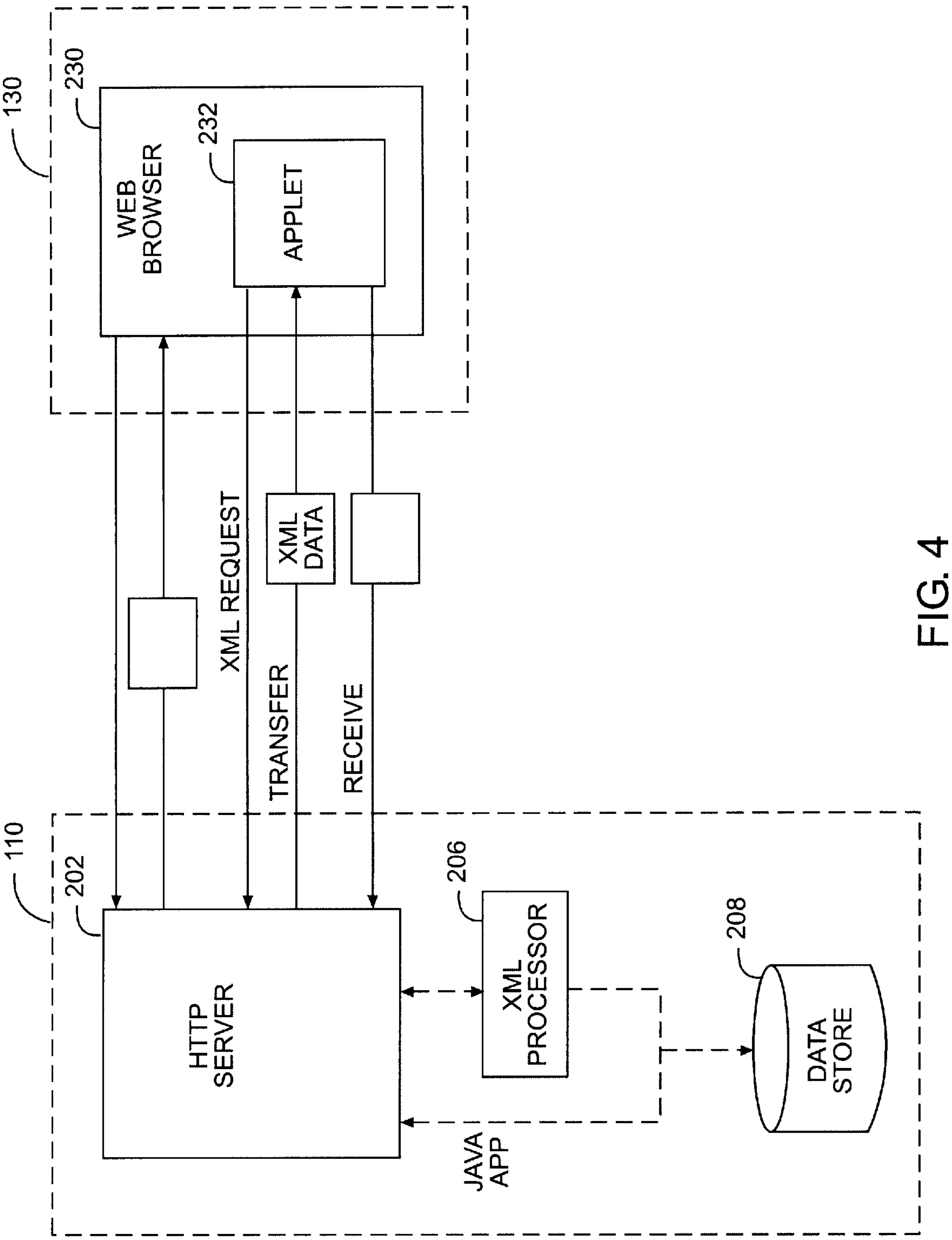
FIG. 4 is a functional diagram illustrating data-aware SGML transfer between a fuel dispenser and a remote system in accordance with an alternative exemplary embodiment of the present invention.

If the remote system 130 lacks native XML support but provides platform resources adequate for executing Java applets 232, the data store 208 included in the fuel dispenser 110 may, in another exemplary embodiment shown in FIG. 4, include a Java applet 232 designed to enable XML support. The fuel dispenser 110 transfers the Java applet 232 to the remote system 110 for execution by its web browser 230. Once executing on the remote system 130, the Java applet 232 provides the web browser 230 of remote system 130 with the ability to process XML data. Ideally, the Java applet 232 provides a service interface (not shown) on the remote system 130 such that an operator can interactively modify or edit select fuel dispenser operating parameters. Additionally, the Java applet 232 should provide the ability to transfer any such modified parameters back to the fuel dispenser 110 for subsequent use. These capabilities depend upon the Java applet 232 being able to directly parse the XML data received from the fuel dispenser 110 into compliant objects suitable for direct manipulation by the Java applet 232. Parsing operations are based on known Document Type Definitions (DTDs). As noted, these DTDs define the particular lexical XML grammar implemented by the fuel dispenser 110. Upon request, the Java applet 232 converts its compliant objects back into XML-formatted data for transfer back to the fuel dispenser 110.

This particular technique of applet-based processing has the additional advantage of not requiring the Java applet 232 to change when new fuel dispenser parameters are added or modified. This is because the Java applet 232 need only contain an XML processor capable of parsing the XML-defined parameters obtained from the fuel dispenser 110 such that they can be modified, verified, and returned to the fuel dispenser 110 in XML format, all without actually having to know what the specific parameters mean in the context of the fuel dispenser's 110 operation.

In operation, the remote system 130 makes an HTML page request to the HTTP server 202 executing in the fuel dispenser 110. In response, the fuel dispenser 110 returns an HTML page including the Java applet 232 obtained from the data store 208 to the remote system's web browser 230. Upon its activation in the remote system 130, the Java applet 232 makes an XML request for one or more data items (parameters) from the fuel dispenser 110. The XML processor 206 responds by providing XML-formatted data, which may be based on machine-formatted data obtained from the data store 208 or from operating memory (not shown), to the HTTP server 202. The HTTP server 202 transfers the XML data to the Java applet 232 in the remote system 130, where it may be viewed, modified, stored, or otherwise processed. If parameters are edited in the remote system 130, the Java applet 232 returns these updated parameters to the fuel dispenser 110 in XML format.

The present invention may, of course, be carried out in other specific ways than those herein set forth without departing from the spirit and essential characteristics of the invention. As noted, the particular communications interface (LAN, WAN, dial-up, direct) between the fuel dispenser (the local system) and the remote system is not critical to practicing the present invention. Further, exemplary embodiments of the fuel dispenser in the present invention may be compatible with HTML/XML-compliant remote systems and with non-XML compliant remote systems. In the latter case, the fuel dispenser of the present invention may transfer a Java applet to the remote system, thereby imparting XML processing capability to the remote system, or may itself provide XML-to-HTML conversion based on internally stored XSL-based style sheets. The present embodiments are, therefore, to be considered in all respects as illustrative and not restrictive, and all changes coming within the meaning and equivalency range of the appended claims are intended to be embraced therein.

What is claimed is:

1. A fuel dispenser comprising:

a communications interface adapted to transfer information between a remote system and said fuel dispenser;

a communications processor associated with said communications interface and adapted to provide:

a) a protocol service operating such that said information transferred between said fuel dispenser and said remote system is transferred in accordance with a defined protocol;

b) a data type aware SGML service operating such that select operating data transferred from said remote system to said fuel dispenser in a data type aware SGML format is converted to a native format; and c) a storage service operating such that said select operating data is stored in an associated memory in said native format; and a controller adapted to control one or more operations of said fuel dispenser based on said select operating data stored in said associated memory.

2. The fuel dispenser of claim 1 wherein said communications processor is further adapted to transfer select stored data to said remote system via said communications interface in response to a configurable data request from said remote system, and wherein said select stored data is converted from a native format to a data type aware SGML format before said transfer to said remote system.

3. The fuel dispenser of claim 2 wherein said communications processor is further adapted to transfer a stored Java applet to said remote system in conjunction with transferring said select stored data to set remote system in response to receiving said configurable data request.

4. The fuel dispenser of claim 2 wherein said communications processor is further adapted to transfer stored data type aware style sheet language information to said remote system in conjunction with transferring said select stored data to said remote system in response to receiving said configurable data request.

5. The fuel dispenser of claim 4, wherein said data type aware SSL is XSL.

6. The fuel dispenser of claim 1 wherein said communications processor is further adapted to transfer select stored data to said remote system via said communications interface in response to a configurable data request from said remote system, and wherein said select stored data is converted from a data type aware SGML format to a HTML format before said transfer to said remote system.

7. The fuel dispenser of claim 6 wherein said communications processor uses stored style sheet language information to perform said conversion of said select stored data from said data type aware SGML format to said HTML format.

8. The fuel dispenser of claim 1 wherein said defined protocol is a standard hypertext transfer protocol.

9. The fuel dispenser of claim 1, wherein said defined protocol is a standard file transfer protocol.

10. The fuel dispenser of claim 1, wherein said data type aware SGML is XML.

11. A fuel dispenser comprising:

a communications interface adapted to transfer information between said fuel dispenser and a remote system;

a communications processor associated with said communications interface and adapted to provide:

a) a protocol service operating such that information transferred between said communications processor and said remote system via said communications interface is transferred in accordance with a defined protocol;

b) a conversion service operating such that data items included in information received from said remote system are converted from a transfer format to a native format based on interpreting embedded data tags included in said information received from said remote system; and c) a storage service such that said data items are stored in a memory associated with said fuel dispenser after conversion to said native format; and a controller for controlling one or more operations of said fuel dispenser based on said stored data items.

12. The fuel dispenser of claim 11 further wherein said conversion service converts select operating data stored in said memory from said native format to said transfer format for transfer to said remote system via said communications interface, said transfer format including one or more embedded data tags associated with said select operating data, said one or more embedded data tags selected from a defined set of data tags.

13. The fuel dispenser of claim 12 wherein said conversion service is an XML service adapted to translate said data items in said information received from said remote system from an XML format to a native format, and further adapted to translate said select operating data stored in said memory from said native format to said XML format for subsequent transfer to said remote system.

14. A method of supporting remote interaction in a fuel dispenser, said method comprising:

establishing a communications link between said fuel dispenser and a remote system based on a common protocol;

receiving a data type aware SGML data request from said remote system via said communications link;

identifying one or more fuel dispenser operating values corresponding to said data request;

converting said one or more fuel dispenser operating values from a native format to produce data type aware SGML-formatted fuel dispenser operating values; and transferring said data type aware SGML-formatted fuel dispenser operating values to said remote system via said communications link.

15. The method of claim 14 further comprising:

receiving an HTML page request corresponding to a Java applet request prior to receiving said data type aware SGML data request from said remote system; and transferring a Java applet from a memory associated with said fuel dispenser to said remote system in response to said HTML page request;

said Java applet adapted to enable said remote system to transmit said data type aware SGML data request to said fuel dispenser and to manipulate said data type aware SGML-formatted fuel dispenser operating values received from said fuel dispenser.

16. The method of claim 14 further comprising:

receiving an HTML page request from said remote system via said communications link;

identifying one or more fuel dispenser operating values corresponding to said HTML page request;

converting said one or more fuel dispenser operating values from a native format to a data type aware SGML format, thereby producing data type aware SGML-formatted fuel dispenser operating values;

converting said data type aware SGML-formatted fuel dispenser operating values to a HTML format using one or more data type aware style sheets stored in a memory associated with said fuel dispenser, thereby producing HTML-formatted fuel dispenser operating values; and transferring said HTML-formatted fuel dispenser operating values to said remote system via said communications link.

17. The method of claim 14 further comprising:

receiving a data type aware SGML-formatted data set corresponding to said one or more fuel dispenser operating values from said remote system;

converting said data type aware SGML-formatted data set into a native format data set;

storing said native format data set into a memory associated with said fuel dispenser; and controlling one or more operations of said fuel dispenser based at least in part on said stored native format data set.

18. The method of claim 14, wherein said data type aware SGML is XML.

19. A method of supporting remote parameter editing in a fuel dispenser, said method comprising:

receiving a data request from a remote system;

converting stored information associated with said data request from a native format into a data type aware SGML format, thereby forming converted information;

transferring said converted information to said remote system;

receiving edited information from said remote system, said edited information received in a data type aware SGML format;

parsing said data type aware SGML format edited information to extract one or more updated parameters; and storing said one or more updated parameters in a memory associated with the fuel dispenser.

20. The method of claim 19 further comprising transferring data type aware style sheet information associated with said converted information for use by said remote system in translating said converted information into an HTML format.

21. The method of claim 19 further comprising transferring a Java applet stored in a memory associated with said fuel dispenser for execution by said remote system, said Java applet adapted to translate said converted information from said data type aware SGML format to an HTML format at said remote system.

* * * * *